(12) United States Patent
Bras et al.

(10) Patent No.: US 7,947,121 B2
(45) Date of Patent: May 24, 2011

(54) METHOD FOR RECEIVING FLUID FROM A NATURAL GAS PIPELINE

(75) Inventors: Eduard Coenraad Bras, The Hague (NL); Cornelis Buijs, The Hague (NL); Jill Hui Chiun Chieng, Amsterdam (NL); Robert Klein Nagelvoort, The Hague (NL)

(73) Assignee: Shell Oil Company, Houston, TX (US)

( * ) Notice: Subject to any disclaimer, the term of this patent is extended or adjusted under 35 U.S.C. 154(b) by 269 days.

(21) Appl. No.: 12/095,096

(22) PCT Filed: Nov. 27, 2006

(86) PCT No.: PCT/EP2006/068914
§ 371 (c)(1),
(2), (4) Date: Oct. 13, 2008

(87) PCT Pub. No.: WO2007/060228
PCT Pub. Date: May 31, 2007

(65) Prior Publication Data
US 2009/0133578 A1 May 28, 2009

(30) Foreign Application Priority Data
Nov. 28, 2005 (EP) .................................. 05111364

(51) Int. Cl.
*B01D 19/00* (2006.01)
(52) U.S. Cl. ............. 95/253; 95/259; 95/260; 96/182; 96/204
(58) Field of Classification Search ............ 95/241, 95/253, 259, 260; 96/182, 183, 194, 204; 137/171, 177, 197, 207
See application file for complete search history.

(56) References Cited

U.S. PATENT DOCUMENTS

| 2,873,814 | A | 2/1959 | Maher ......................... 183/2.7 |
| 4,160,652 | A | 7/1979 | Martin et al. ................... 55/46 |
| 4,233,154 | A | 11/1980 | Presley ....................... 210/800 |
| 4,778,443 | A | 10/1988 | Sands et al. ................... 494/31 |
| 5,064,448 | A | 11/1991 | Choi ............................. 55/38 |
| 5,232,475 | A * | 8/1993 | Jepson ......................... 95/260 |
| 6,390,114 | B1 | 5/2002 | Haandrikman et al. ........... 137/2 |
| 2003/0232894 | A1 * | 12/2003 | Mohedas et al. ............. 518/726 |

FOREIGN PATENT DOCUMENTS

| EP | 331295 | 9/1989 |
| GB | 2242373 | 10/1991 |
| GB | 2369787 | 6/2002 |
| WO | WO2004057153 | 7/2004 |

* cited by examiner

*Primary Examiner* — Duane Smith
*Assistant Examiner* — Tiffany N Palmer

(57) ABSTRACT

A method for receiving fluid from a natural gas pipeline, the fluid comprising gaseous hydrocarbons, liquid hydrocarbons, water and optionally solids, the method comprising: (a) in a slug catcher (10), receiving the fluid comprising gaseous hydrocarbons, liquid hydrocarbons, water and optionally solids from at least one pipeline (20a, 20b, 20c) (b) in the slug catcher (10), separating at least a portion of the gaseous hydrocarbons from the rest of the fluid to leave a liquid mixture or a liquid/solid mixture; (c) directing at least a portion of the liquid mixture or liquid/solid mixture to a separation vessel (14), preferably a three-phase separation vessel; and (d) in the event of a surge of liquids and optionally solids to the slug catcher (10), directing at least a portion of the liquid mixture or the liquid/solid mixture from the slug catcher (10) to a surge vessel (12).

28 Claims, 1 Drawing Sheet

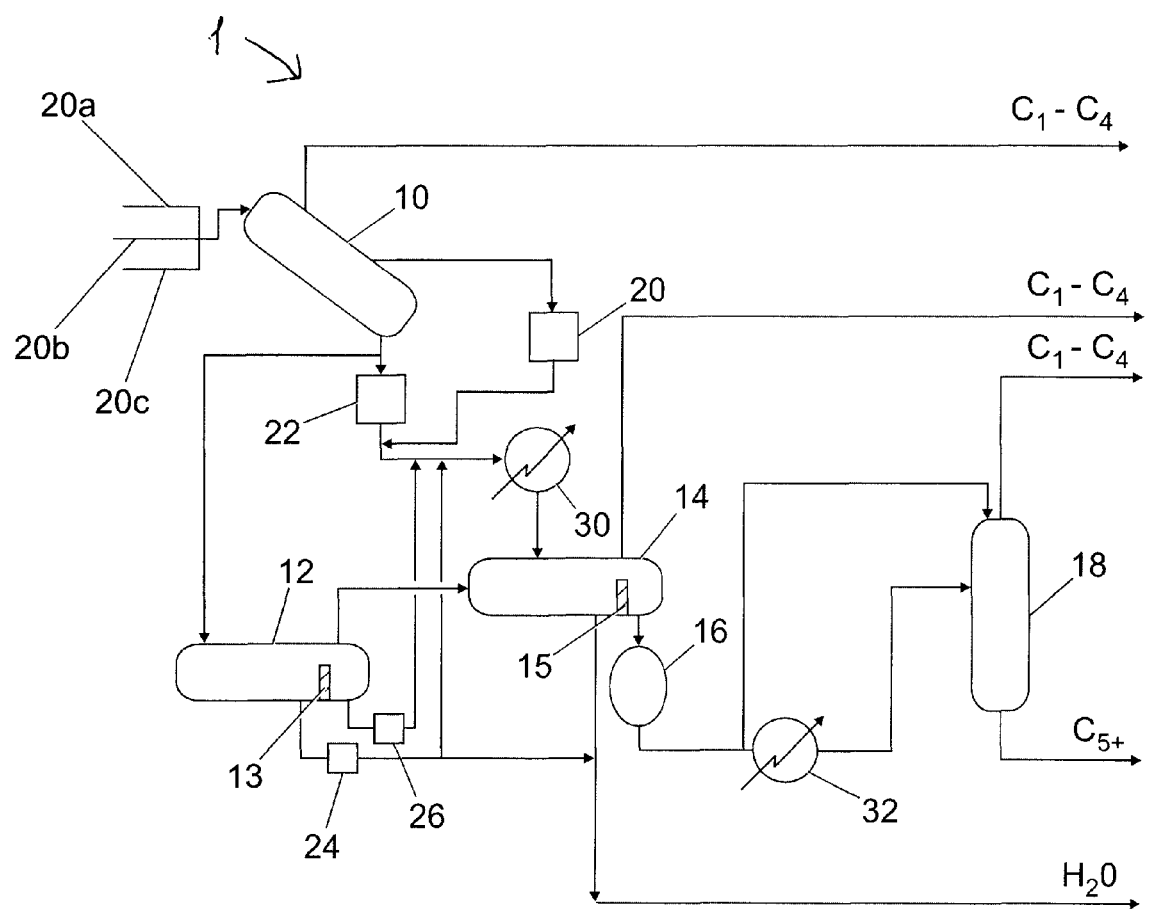

METHOD FOR RECEIVING FLUID FROM A NATURAL GAS PIPELINE

The present application claims priority from European Patent Application 05111364.5 filed 28 Nov. 2005.

FIELD OF THE INVENTION

The present invention provides to a method for receiving fluid from a natural gas pipeline, the fluid comprising gaseous hydrocarbons, liquid hydrocarbons, water and optionally solids.

BACKGROUND OF THE INVENTION

Natural gas pipelines from a natural gas reservoir of from a gas producing platform often contain significant amounts of liquids, such as hydrocarbon condensations and water, and optionally smaller amounts of solids that may interfere with the proper operation of downstream equipment and processes. The liquids in a natural gas pipeline are often referred to as 'slugs'. In order to separate the liquids and solids from the natural gas, fluids and solids from a natural gas pipeline are typically received into a slug catcher. The slug catcher is normally sized so that it is large enough to receive the volume of liquids and any solids when pigging operations are being performed or have recently been performed. The slug catcher is also designed to separate the fluids received and particularly to separate most of the gas from the liquid and solids and also preferably to separate the liquids into to a liquid water phase and a liquid hydrocarbon phase.

Although generally satisfactory, slug catcher's efficacy in such separation can be compromised in case of a surge, i.e. when an unexpectedly large slug of liquids and optionally solids is deposited in the slug catcher. This can for example result in downstream equipment, such as a three-phase separator, being starved of gaseous hydrocarbons which may cause shut-down of further downstream processing units, e.g. an LNG plant, a Fischer-Tropsch plant or a methanol plant. It may also result in the supply of liquids to a downstream gas processing system.

Typically a surge is caused by the operation of pipeline pigs in the pipeline. Such pigs are used for periodic cleaning of the pipeline or for other operations. In certain operations such as for batch inhibition, a liquid slug is provided between two pipeline pigs. A single pig may be used for cleaning and in use, a large slug will gather in front of the pig. This large slug will cause a surge when it enters the slug catcher.

In the prior art, several methods have been disclosed to deal with unexpectedly large slugs in natural gas pipelines. Reference is made in this respect for example to EP 331 295 A and U.S. Pat. No. 4,160,652.

SUMMARY OF THE INVENTION

A novel method for receiving fluid from a natural gas pipeline has been found, wherein the fluid received in a sludge catcher that separates the fluid into gaseous hydrocarbons and a mixture of liquids and optionally solids. At least part of the mixture is directed to a separation vessel and, in the event of a surge, at least part of the mixture is directed to a surge vessel.

According, the invention provides a method for receiving fluid from a natural gas pipeline, the fluid comprising gaseous hydrocarbons, liquid hydrocarbons, water and optionally solids, the method comprising:

(a) in a slug catcher, receiving the fluid comprising gaseous hydrocarbons, liquid hydrocarbons, water and optionally solids from at least one pipeline;

(b) in the slug catcher, separating at least a portion of the gaseous hydrocarbons from the rest of the fluid to leave a liquid mixture or a liquid/solid mixture;

(c) directing at least a portion of the liquid mixture or liquid/solid mixture to a separation vessel, preferably a three-phase separation vessel; and (d) in the event of a surge of liquids and optionally solids to the slug catcher, directing at least a portion of the liquid mixture or the liquid/solid mixture from the slug catcher to a surge vessel.

An important advantage of the method according to the invention is that it provides uninterrupted supply, even in the event of a surge, both of a stream of gaseous hydrocarbons to downstream gas processing and of liquid hydrocarbons to downstream liquid hydrocarbon processing.

Moreover, the slug catcher may be made much smaller than conventional slug catchers since it does not need the capacity to cope with the additional liquid volume received during surges. This is beneficial since the provision of the, typically lower pressure surge vessel, is less expensive than the, typically higher pressure, slug catcher.

BRIEF DESCRIPTION OF THE DRAWING

FIG. 1 is a scheme showing a plant for receiving natural gas comprising condensate hydrocarbons and water from a well.

DETAILED DESCRIPTION OF THE INVENTION

In step (a) of the method according to the invention, fluid from at least one natural gas pipeline is received in a slug catcher. The fluid comprises gaseous hydrocarbons, liquid hydrocarbons (typically hydrocarbon condensates), water and optionally solids.

The fluid is a hydrocarbon gas stream that comprises liquid hydrocarbons, water and optionally solids. The hydrocarbon gas stream preferably comprises at least 50 vol % C1-C4 hydrocarbons, more preferably at least 90 vol %. Examples of such gas streams are natural gas, associated gas and coalbed methane. During normal operation, the fluid will mainly comprise gaseous hydrocarbons with a lower amount of liquid hydrocarbons, water and optionally solids. In the event of a surge, the fluid may temporarily mainly exist of liquids, optionally in combination with solids.

The fluid may be received in the slug catcher from a plurality of pipelines, preferably two or three pipelines.

The gaseous hydrocarbons in the fluid received in the slug catcher may comprise gaseous impurities, such as hydrogen sulphide, nitrogen, carbon dioxide or other gases.

The water received in the slug catcher may contain impurities, such as mercury, scale, and additives such as hydrate additives including glycol and anti-corrosion additives, dissolved salt such as sodium, calcium and magnesium chlorides.

Optionally, solids may be present in the fluid received in the slug catcher. Examples of such solids are iron sulphate, scale, other carbonates, sand, and small quantities of barium sulphate or strontium sulphate. The solids may comprise pyrophoric compounds.

In step (b) of the method according the invention, at least a portion of the gaseous hydrocarbons is separated, in the slug catcher, from the rest of the fluid received in the slug catcher, thus leaving a liquid mixture, or, if the fluid received comprises solids, a liquid/solid mixture in the slug catcher. Preferably, substantially all of the undissolved gas received in the slug catcher will be separated from the liquid or liquid/solid mixture in the slug catcher. 'Substantially all' as used herein, unless otherwise stated, typically means at least 90% of the total stream, preferably at least 95% of the total stream and may mean 100% of the total stream.

The separated gaseous hydrocarbons are discharged from the slug catcher and are preferably cleaned and further processed.

In step (c), at least a portion of the liquid mixture or the liquid/solid mixture is directed to a separation vessel. Preferably, the mixture is directed to the separation vessel via a solids filter to remove some, preferably most, of any solids in the mixture.

In the event of a surge, extra liquids and typically solids compared to normal flow rates are deposited in the slug catcher. In the method according to the invention, at least a portion of the liquid or liquid/solid mixture in the slug catcher is directed to a surge vessel in the event of such surge (step (d)).

The surge of liquids and optionally solids may be caused by the operation of pipeline pigs in the natural gas pipe line from which the fluid is received in the slug catcher. If the fluid is received from a plurality of pipeline, it is preferred that only one pipeline is cleaned using pipeline pigs at any one time.

Typically during normal operation, all the liquids and any solids in the liquid or liquid solid mixture in the slug catcher are directed to the separation vessel, preferably via a solids filter, and during a surge, at least a portion of the liquids and any solids are directed to the surge vessel and preferably a portion also to the separation vessel.

Preferably, the liquid or liquid/solid mixture is further separated, in the slug catcher, into two streams: a first stream comprising predominantly water and any solids; and a second stream comprising predominantly liquid hydrocarbons. 'Predominantly' as used herein, unless otherwise stated, typically means at least 90% of the total stream, preferably at least 95% of the total stream.

The slug catcher may be any slug catcher that is suitable for separating the gaseous hydrocarbons from the rest of the fluid. Preferably, the slug catcher comprises means to separate the liquid or liquid/solid mixture into a first stream enriched in water and any solids, and a second stream enriched in liquid hydrocarbons. A particularly suitable slug catcher comprises a plurality of tubes disposed at an angle to the horizontal, such that the hydrocarbons and water within each tube will form separate layers, the hydrocarbon layer being above the water layer. Said angle is preferably less than 5°. It may be between 1° and 2.5°. Typically the angle is greater towards an inlet end of said tubes compared to an outlet end of said tubes. Alternatively the slug catcher may be a vessel in which the liquid hydrocarbons and water separate naturally into layers and the upper liquid hydrocarbon layer is allowed to pass over a weir in order to separate the liquid hydrocarbons from the water.

Preferably, the portion of the mixture that is directed to the surge vessel in step (d) is the first stream comprising predominantly water and any solids and no other stream is directed to the surge vessel. Alternatively, the surge vessel receives the first stream comprising predominantly water and any solids as well as at least a portion of the second stream comprising predominantly liquid hydrocarbons. In that case, the second stream typically proceeds out of the same outlet of the slug catcher to the surge vessel as the first stream; hence the second stream will typically proceed into the surge vessel after the first stream.

Without the surge vessel, there would be a danger that the liquids and solids within the slug catcher will be of such a volume that they could block an outlet of the slug catcher through which the gaseous hydrocarbons are normally discharged. This may cause a downstream gaseous processing plant, such as a Fischer Tropsch plant, to shut down. Moreover, the method according to the invention allows uninterrupted supply of liquid hydrocarbons to the separation vessel and other downstream components.

The slug catcher typically operates at a pressure of between 40-120 bar, preferably 60-90 bar.

The surge vessel preferably operates at a pressure less than that of the slug catcher, for example at a pressure of between 20-40 bar, preferably 25-35 bar. If the slug catcher operates at a higher pressure than the surge vessel, the pressure within the slug catcher causes the mixture to move to the surge vessel. Therefore for such embodiments, no pumps are required although typically a valve or other such means will be needed.

Preferably a solids filter is not provided between the slug catcher and the surge vessel. Rather, it is preferred to allow any solids in the mixture to be directed to the surge vessel where they can be removed more conveniently. Preferably any solids in the surge vessel are allowed to settle in the surge vessel and are periodically removed. The solids are preferably removed as a slurry although sometimes it may be necessary to manually remove the solids from the surge vessel.

Preferably the slug catcher is in normal operation whilst solids are being removed from the surge vessel. Thus, in contrast to certain known designs, it is not generally necessary with the method according to the invention to shut down the slug catcher in order to remove solids from the system.

Preferably the mixture directed to the surge vessel is further separated into a plurality of streams: a stream containing predominantly water; a stream containing predominantly liquid hydrocarbons and optionally a stream containing predominantly gas, particularly gaseous hydrocarbons.

Typically, the gaseous hydrocarbons in the surge vessel are substantially gaseous hydrocarbons which were dissolved in the liquid phases under the typically higher pressure in the slug catcher. It will be appreciated that a stream containing predominantly gas will only be formed where the pressure and temperature in the surge vessel is different from that of the slug catcher (which is preferably the case) so as to cause gas to come out of solution—otherwise there will essentially be no gas in the surge vessel.

Preferably, the surge vessel is a vessel suitable for separating water from liquid hydrocarbons. More preferably, the surge vessel is a vessel in which in use, liquid hydrocarbons and water separate naturally into layers and the upper liquid hydrocarbon layer is allowed to pass over a weir in order to separate the liquid hydrocarbons from the water.

Preferably, the surge vessel has at least one access hole to allow for occasional inspection and cleaning of the inside of the surge vessel.

Preferably, the stream containing predominantly liquid hydrocarbons is directed to the separation vessel. Preferably, the stream containing predominantly water is also directed to the separation vessel. The separation of the water and liquid hydrocarbons in the surge vessel is preferred even when both streams are then sent to the same separation vessel, since this helps to prevent emulsions forming.

In order to remove any solids, both the stream containing predominantly water and the stream containing predominantly liquid hydrocarbons are preferably filtered before being supplied to the separation vessel.

Preferably the surge vessel is filled with liquid hydrocarbons before receiving the liquid or liquid/solid mixture from the slug catcher, such that the liquid hydrocarbons will be directed to the separation vessel when the liquid and any solids are received from the slug catcher. Thus, this helps to ensure that there is no interruption in the supply of hydrocarbon liquid to the separation device and so mitigates the risk of a plant shut down due to starvation of liquid hydrocarbons.

Preferably, the liquids directed from the slug catcher and optionally from the surge vessel to the separation vessel are separated, in the separation vessel, into a plurality of streams: a stream containing predominantly water, a stream containing predominantly liquid hydrocarbons and optionally a stream containing predominantly gas, particularly gaseous hydrocarbons. The third gaseous stream is normally only formed where the pressure and temperature in the separation device is different from that of the slug catcher (which is preferably the case) so as to cause gas to come out of solution—otherwise there will essentially be no gas in the separation vessel. The gaseous hydrocarbons in the separation device are thus substantially gaseous hydrocarbons which were dissolved in the liquid phases under the typically higher pressure in the slug catcher and/or surge vessel.

The separation vessel may be any separation vessel suitable for separating a mixture of substantially water and liquid hydrocarbons into water and liquid hydrocarbons. Preferably the separation vessel device is a three-phase separation vessel for separating such mixture into a water phase, a liquid hydrocarbon phase and a gaseous phase.

Preferably, the separation vessel operates at a pressure less than that of the slug catcher and preferably also less than that of the surge vessel.

Preferably the separation device operates at a pressure of 15-35 bar, more preferably 20-30 bar.

It is an advantage of the method according to the invention that the separation device may be in normal operation whilst solids are being removed from the surge vessel. Therefore, any other downstream devices for processing the liquid hydrocarbons, such as a stabiliser, may also be maintained in full operation whilst solids are being removed from the surge vessel.

There may be a plurality of such separation vessels. Preferably when there are n pipelines feeding the slug catcher there are (n+1) such separation vessels (n being any integer.) Typically one of the (n+1) separation vessels will be a stand-by separation vessel.

The stream containing predominantly liquid hydrocarbons as separated in the separator vessel is preferably supplied to a stabiliser to remove dissolved gases and optionally small amount of water left in the liquid hydrocarbon stream to obtain a liquid hydrocarbon product stream. Suitable stabilisers for this purpose are known in the art.

The gaseous hydrocarbons from the slug catcher and optionally the separation vessel and optionally the surge vessel, and optionally from the stabiliser, may be converted to a mixture of carbon monoxide and hydrogen (known as synthesis gas), for example by partial oxidation of the gaseous hydrocarbons.

The carbon monoxide and hydrogen may be converted to $C_{5+}$ hydrocarbons by the Fischer Tropsch process. The Fischer Tropsch process is well known to those skilled in the art and involves synthesis of hydrocarbons from a gaseous mixture of carbon monoxide and hydrogen, by contacting that mixture at reaction conditions with a Fischer Tropsch catalyst.

Alternatively, the gaseous hydrocarbons from the slug catcher and optionally the separation vessel and optionally the surge vessel and optionally from the stabiliser, may be used to prepare pipeline gas.

Alternatively, the gaseous hydrocarbons from the slug catcher and optionally the separation vessel and optionally the surge vessel and optionally from the stabiliser, may be used to prepare liquefied natural gas.

Preferably the gaseous hydrocarbons from the slug catcher and optionally the separation vessel and optionally the surge vessel and optionally from the stabiliser are cleaned before they are used to prepare carbon monoxide and hydrogen, pipeline gas, liquefied natural gas or for any other use.

DETAILED DESCRIPTION OF THE DRAWING

An embodiment of the present invention will now be described, by way of example, with reference to the FIG. 1, which is a scheme showing a plant for receiving natural gas comprising condensate hydrocarbons and water from a well.

Plant 1 comprises slug catcher 10 adapted to receive a fluid comprising gaseous hydrocarbons, liquid hydrocarbons, impurities and sometimes solids from three natural gas pipelines 20a, 20b and 20c.

Pipelines 20a, 20b and 20c extend to a well which produces predominantly gaseous hydrocarbons. Pipelines 20a, 20b and 20c may extend over long distances e.g. over several hundreds of kilometers.

The fluid is received at an unsteady flow rate. Slug catcher 10 separates most of the gaseous hydrocarbons by allowing the gas received to proceed from an outlet at the top of slug catcher 10 to a gas cleaning process (not shown) and then, for example, to a Fischer Tropsch Plant (not shown).

The solids, water and liquid hydrocarbons left in slug catcher 10 then separate into layers naturally. The lowermost water/solids mixture proceeds through a bottom outlet in slug catcher 10 to solids filter 22 and then to heater 30. The liquid hydrocarbons proceed through a separate outlet to heater 30 via solids filter 20. The liquid hydrocarbon outlet is spaced above that of the water outlet so that predominantly only hydrocarbons (which will form a layer on top of the water) proceed therethrough and predominantly only water and solids proceed through the lower outlet.

The separate outlets from slug catcher 10 to heater 30 help prevent emulsions forming between the water and liquid hydrocarbons, which would make the downstream separation process more difficult.

Heater 30 heats the water and liquid hydrocarbons to 50-60° C. in order to break emulsions. For liquids which do not form emulsions, the heater need not be provided or may be switched off leaving the mixture at a temperature of typically around 10° C. The mixture then proceeds to three-phase separator 14.

In certain embodiments, a plurality of such three-phase separators may be provided, each separator having all the downstream components as that described for separator 14.

In certain embodiments, the liquid hydrocarbons and water streams from slug catcher 10 may not be mixed again and may proceed to separate three-phase separators.

Three phase separator 14 comprises weir 15 over which the upper liquid hydrocarbon layer may flow. The water layer in separator 14 does not reach the top of weir 15 but rather is drawn off from an outlet at the bottom of separator 14 close to weir 15. The water may be reinjected into the reservoir or may be purified further for disposal or use. Gaseous hydrocarbons, particularly those which have come out of solution due to the lower pressure in separator 14 compared to slug catcher 10, are removed through an upper outlet for further use.

Liquid hydrocarbons from separator 14 may pass through coalescer 16, second heater 32 and stabiliser 18 in order to further separate out any residual water and gaseous hydrocarbons in the liquid hydrocarbon stream.

Heater 32 may be switched off or removed from the system. Where present and functioning, only a portion (typically from 30-70%) of the hydrocarbons are heated in the heater 32—the rest proceed directly to the top of stabiliser 18.

Heater 32 typically heats the liquid to a temperature of around 60-120° C. typically approximately 90° C.

Stabiliser 18, which includes a re-boiler (not shown), separates the $C_{5+}$ hydrocarbons from the $C_{1-4}$ hydrocarbons, as well as removing residual water.

Heater 32 may use some of the heat from the $C_{5+}$ stream.

On a fairly regular basis, such as once every 2-8 weeks, one of pipelines 20a, 20b, or 20c must be cleaned. This involves running a pipeline pig (not shown) through the pipeline. As part of the pigging operation, a surge in the flow rate is experienced producing a large volume of liquids in slug catcher 10. Typically a much larger volume of solids (caused by erosion of the long pipeline) will be produced at this time.

The extra volume of liquids and solids produced could cause the water and solids level in slug catcher 10 to rise above the higher liquid hydrocarbon outlet, which can starve the downstream components, such as separator 14 of hydrocarbons. This can result in the downstream components automatically shutting down.

Also the water and solids level could rise to above the outlet for the gaseous hydrocarbons which could shut down any gaseous downstream gas processing plant, such as a Fischer Tropsch plant.

Surge vessel 12 is provided to cope with such a surge. The primary purpose of surge vessel 12 is to maintain a flow of gaseous hydrocarbons to any downstream processing facility and liquid hydrocarbons to separator 14 so that separator 14 and downstream components may continue to operate even when the surge is experienced.

An inlet of surge vessel 12 is connected to the outlet of slug catcher 10. The outlet of surge vessel 12 is connected to the inlet of separator 14, typically upstream of heater 30.

Thus, in the event of a surge due to cleaning of one of the pipelines 20a-c, or for any other reason such as batch inhibition, the fluid from the water outlet of slug catcher 10 is diverted to surge vessel 12. A solids filter is not provided since it is preferred to allow the solids to pass to surge vessel 12. This allows the level of the hydrocarbons in slug catcher 10 to fall and exit slug catcher 10 from the normal outlet to separator 14 as described above.

Furthermore, surge vessel 12 is preferably filled with liquid hydrocarbons before the surge such that when fluid from slug catcher 10 is diverted into surge vessel 12, the liquid hydrocarbons will be displaced and fed to separator 14, thus maintaining a flow of liquid hydrocarbons to separator 14.

Surge vessel 12 is also operated at a lower pressure than slug catcher 10 and so, whilst slug catcher 10 may be sized to cope with the surges in flow rates, it is preferred to utilise surge vessel 12 because it is more efficient to have the extra volume required provided in a tank operated at a lower pressure. Also, it is much easier to remove solids from surge vessel 12 whilst the rest of the process continues compared to removing them directly from slug catcher 10 which may affect the efficient running of the plant 1 or indeed require slug catcher 10 and therefore the whole plant 1 to be temporarily shut down.

The fluids in surge vessel 12 are allowed to separate into layers naturally. Gas will come out of solution here due to the reduced pressure in surge vessel 12 compared to slug catcher 10. The gas is diverted to separation device 14.

The liquid hydrocarbons will pass over weir 13 and will proceed to separation device 14 via solids filter 26 and heater 30.

Water will also separately proceed to separator 14 via solids filter 24 and heater 30.

Alternatively water may bypass separator 14, depending on its purity and on the final use chosen for the water in the particular instance.

The solids in surge vessel 12 are typically removed as a slurry and sent for treatment and disposal. Alternatively if they cannot be removed in the form of a slurry, surge vessel 12 may be taken offline, opened and the solids manually removed. Whilst this is preferably avoided, on the occasions it is necessary, it is much more convenient to do this when surge vessel 12 is isolated from the rest of the plant 1 and the rest of the plant 1 may continue in normal operation. This is in contrast to certain known systems where the solids had to be removed directly from the slug catcher and the plant had to be shut down.

Embodiments of the present invention thus allow a continuous flow of gaseous hydrocarbons to a downstream processing facility and also maintain the flow of liquid hydrocarbons to three-phase separator 14 and downstream components, thus mitigating the risk that the plant 1 or downstream processing facility will need to be shut down.

Embodiments of the present invention also benefit in that a smaller slug catcher may be used since it does not need to cope with large surges caused by such operation. Since surge vessel 12 operates at a lower pressure than slug catcher 10, it is less expensive to install and operate.

A preferred use of the gaseous hydrocarbons produced by the plant 1 is in the Fischer Tropsch process, where they are first converted by partial oxidation to a mixture of carbon monoxide and hydrogen, and thereafter to $C_{5+}$ hydrocarbons.

What is claimed is:

1. A method for receiving fluid from a natural gas pipeline, the fluid comprising gaseous hydrocarbons, liquid hydrocarbons, water and optionally solids, the method comprising:
    (a) in a slug catcher, receiving the fluid comprising gaseous hydrocarbons, liquid hydrocarbons, water and optionally solids from at least one pipeline;
    (b) in the slug catcher, separating at least a portion of the gaseous hydrocarbons from the rest of the fluid to leave a liquid mixture or a liquid/solid mixture;
    (c) directing at least a portion of the liquid mixture or liquid/solid mixture from a lower outlet of the slug catcher to a separation vessel; and
    (d) in the event of a surge of liquids and optionally solids to the slug catcher, directing at least a portion of the liquid mixture or the liquid/solid mixture from the slug catcher to a surge vessel wherein an inlet of the surge vessel is connected to the lower outlet of the slug catcher, and wherein an outlet of the surge vessel is connected to the inlet of the separation vessel.

2. A method as claimed in claim 1, wherein the surge of liquids and optionally solids to the slug catcher is caused by the operation of pipeline pigs in the pipeline.

3. A method as claimed in claim 1, wherein during normal operation, the whole liquid mixture or liquid/solid mixture is directed to the separation vessel, and during a surge, at least a portion of the liquid mixture or of the liquid/solid mixture is directed to the surge vessel.

4. A method as claimed in claim 1, wherein in the slug catcher, the liquid mixture or liquid/solid mixture is further separated into two streams: a first stream comprising predominantly water and any solids; and a second stream comprising predominantly liquid hydrocarbons.

5. A method as claimed in claim 4, wherein the first stream comprising predominantly water and any solids is directed to the surge vessel and no other stream is directed to the surge vessel.

6. A method as claimed in claim 1, wherein the slug catcher operates at a pressure of between 40-120 bar.

7. A method as claimed in claim 1, wherein the surge vessel operates at a pressure less than that of the slug catcher.

8. A method as claimed in claim 1, wherein the surge vessel operates at a pressure of between 20-40 bar.

9. A method as claimed in claim 1, wherein during a surge, the pressure within the slug catcher causes at a least a portion of the liquid mixture or the liquid/solid mixture to move to the surge vessel.

10. A method as claimed in claim 1, wherein in step (a) the fluid is received from a plurality of pipelines.

11. A method as claimed in claim 1, wherein the mixture directed to the surge vessel is further separated into a plurality of streams: a stream containing predominantly water; a stream containing predominantly liquid hydrocarbons; and optionally a stream containing predominantly gas.

12. A method as claimed in claim 11, wherein the stream containing predominantly liquid hydrocarbons is directed to the separation vessel.

13. A method as claimed in claim 12, wherein the surge vessel is filled with liquid hydrocarbons before receiving at a least a portion of the liquid mixture or liquid/solid mixture from the slug catcher, such that the liquid hydrocarbons will be directed to the separation vessel when the liquid mixture or the liquid/solid mixture is received.

14. A method as claimed in claim 1, wherein any solids in the surge vessel are allowed to settle in the surge vessel and are periodically removed.

15. A method as claimed in claim 14, wherein the slug catcher is in normal operation whilst the solids are being removed from the surge vessel.

16. A method as claimed in claim 14, wherein the separation vessel is in normal operation whilst the solids are being removed from the surge vessel.

17. A method as claimed in claim 1, wherein the separation vessel operates at a pressure less than that of the slug catcher.

18. A method as claimed in claim 1, wherein the separation vessel operates at a pressure of 15-35 bar.

19. A method as claimed in claim 1, wherein liquids directed to the separation vessel from the slug catcher and from the surge vessel are separated into a plurality of streams: a stream containing predominantly water; a stream containing predominantly liquid hydrocarbons; and optionally a stream containing predominantly gas.

20. A method as claimed in claim 19, wherein the stream containing predominantly hydrocarbons as separated in the separation vessel is supplied to a stabiliser to remove dissolved gases and optionally water to obtain a liquid hydrocarbon product stream.

21. A method as claimed in claim 1, wherein gaseous hydrocarbons from the slug catcher and optionally the separation vessel and optionally the surge vessel, are converted to a mixture of carbon monoxide and hydrogen.

22. A method as claimed in claim 21, wherein the carbon monoxide and hydrogen are converted to $C_{5+}$ hydrocarbons by the Fischer Tropsch process.

23. A method as claimed in claim 1, wherein gaseous hydrocarbons from the slug catcher and optionally the separation vessel and optionally the surge vessel, are used to prepare pipeline gas.

24. A method as claimed in claim 1, wherein gaseous hydrocarbons from the slug catcher and optionally the separation vessel and optionally the surge vessel, are used to prepare liquefied natural gas.

25. A method as claimed in claim 1, wherein during normal operation, the whole liquid mixture or liquid/solid mixture is directed to the separation vessel, via a solids filter, and during a surge, at least a portion of the liquid mixture or of the liquid/solid mixture is directed to the surge vessel and a portion also to the separation vessel.

26. A method as claimed in claim 11, wherein the stream containing predominantly liquid hydrocarbons is directed to the separation vessel, via a solids filter.

27. A method as claimed in claim 1, wherein the separation vessel operates at a pressure less than that of the slug catcher and also less than that of the surge vessel.

28. A method as claimed in claim 1, wherein gaseous hydrocarbons from the slug catcher and optionally the separation vessel and optionally the surge vessel, are converted to a mixture of carbon monoxide and hydrogen, by partial oxidation.

* * * * *